United States Patent
Cole

(10) Patent No.: US 9,218,486 B2
(45) Date of Patent: Dec. 22, 2015

(54) SYSTEM AND METHOD FOR OPERATING POINT AND BOX ENUMERATION FOR INTERVAL BAYESIAN DETECTION

(71) Applicant: Raytheon Company, Waltham, MA (US)

(72) Inventor: Robert J. Cole, Pa Furnace, PA (US)

(73) Assignee: Raytheon Company, Waltham, MA (US)

( * ) Notice: Subject to any disclaimer, the term of this patent is extended or adjusted under 35 U.S.C. 154(b) by 123 days.

(21) Appl. No.: 14/059,832

(22) Filed: Oct. 22, 2013

(65) Prior Publication Data

US 2015/0113645 A1 Apr. 23, 2015

(51) Int. Cl.
*G06F 11/00* (2006.01)
*G06F 12/14* (2006.01)
*G06F 12/16* (2006.01)
*G08B 23/00* (2006.01)
*G06F 21/55* (2013.01)

(52) U.S. Cl.
CPC ..................... *G06F 21/55* (2013.01)

(58) Field of Classification Search
USPC .......................................................... 726/23
See application file for complete search history.

(56) References Cited

U.S. PATENT DOCUMENTS 7,065,465 B2 * 6/2006 Chen et al. ..................... 702/116
7,603,461 B2 * 10/2009 Crosby et al. ................. 709/224
2009/0310496 A1 * 12/2009 Schuster et al. ............... 370/252
2010/0153316 A1 * 6/2010 Duffield et al. .................. 706/12
2013/0198565 A1 * 8/2013 Mancoridis et al. ............ 714/26

FOREIGN PATENT DOCUMENTS

WO WO 2010059679 A2 * 5/2010

OTHER PUBLICATIONS

Almgren, Magnus, et al., "A Multi-Sensor Model to Improve Automated Attack Detection", Lecture Notes in Computer Science: Recent Advances in Intrusion Detection, vol. 5230, (*RAID 2008*), 291-310.
Frigault, Marcel, et al., "Measuring Network Security Using Dynamic Bayesian Network", *4th ACM Workshop on Quality of Protection (QoP '08)*, (2008), 7 pgs.
Modelo-Howard, Gaspar, et al., "Determining Placement of Intrusion Detectors for a Distributed Application through Bayesian Network Modeling", Lecture Notes in Computer Science, vol. 5230, *Recent Advances in Intrusion Detection (RAID 2008)*, (2008), 271-290.

(Continued)

*Primary Examiner* — Dede Zecher
*Assistant Examiner* — Vadim Savenkov
(74) *Attorney, Agent, or Firm* — Schwegman Lundberg & Woessner, P.A.

(57) ABSTRACT

When using intrusion detection systems, security specialists are concerned with false positive rates and true positive rates. False positives are when an alert is raised, but no actual intrusion occurs. True positives are when an alert is raised for an actual intrusion. Ideally, true positive rate is 1 and false positive rate is zero, but such a situation is impossible in the real world. So one must balance a true positive rate and a false positive rate to produce the best result at the best price. One can simplify the choice of detection sets by, instead of determining each possible operating point of the information detection system, by only choosing operating points that are not dominated by other operating points.

16 Claims, 6 Drawing Sheets

(56) References Cited

OTHER PUBLICATIONS

Ou, Xinming, et al., "An Emrirical Approach to Modeling Uncertainty in Intrusion Analysis", *2009 Annual Computer Security Applications Conference (ACSAC '09)*, (2009), 494-503.

Xie, Peng, et al., "Using Bayesian Networks for Cyber Security Analysis", *2010 IEEE/IFIP International Conference on Dependable Systems and Networks (DSN)*, (2010), 211-220.

Zhai, Yan, et al., "Reasoning about Complementary Intrusion Evidence". *20th Annual Computer Security Applications Conference (ACSAC '04)*, (2004), 10 pgs.

\* cited by examiner

SYSTEM AND METHOD FOR OPERATING POINT AND BOX ENUMERATION FOR INTERVAL BAYESIAN DETECTION

TECHNICAL FIELD

The present invention relates to computers and more particularly to the intrusion detection in computers.

BACKGROUND ART

As the use of computers becomes more and more common, so do attempts to intrude into such systems. Attempts to intrude into a computer or network of computers may take many different possible forms, such as viruses, Trojan horses, malware, policy violations, and the like.

An intrusion detection system may be used to monitor computers and networks of computers to identify possible intrusions, log information about the possible intrusion, and report such possible intrusions. An intrusion detection system issues alerts under certain conditions, indicating that an attempt has been made or is currently being made to intrude into the system. It would be desirable to have an efficient, reliable, and accurate method to find intrusions.

BRIEF DESCRIPTION OF THE DRAWINGS

In the drawings, which are not necessarily drawn to scale, like numerals may describe similar components in different views. Like numerals having letter suffixes may represent different instances of similar components. Some embodiments are illustrated by way of example, and not limitation, in the figures of the accompanying drawings in which.

DETAILED DESCRIPTION

Figure 1:
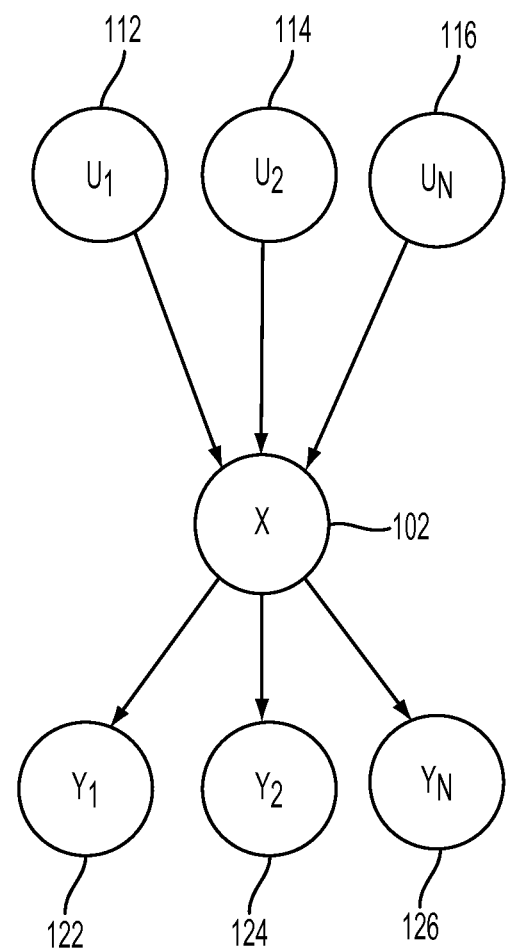
FIG. 1 is a block diagram illustrating an exemplary singly-connected network.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

There are several terms that should be defined here. A "true positive" or "TP" is when an actual attack or intrusion is made into a computer system that causes an intrusion detection system ("IDS") to produce an alarm or otherwise note the intrusion. A "false positive" or "FP" is an event that causes an IDS to produce an alarm or note an intrusion when no actual intrusion is taking place. A "true negative" is when no attack or intrusion is taking place and no alarm is raised. A "false negative" is when an IDS fails to detect an intrusion that is taking place. Of these four conditions, the most important for purposes of this disclosure are TP and FP. At the system level (i.e., as an aggregate of multiple sensors) a true positive may be referred to as S_TP and a system level false positive may be referred to as S_FP.

Current approaches to intrusion detection focus on single events and do not explicitly represent detector uncertainty in their design. Tools that would allow an analyst to comprehensively detect attacks across multiple events under uncertainty would benefit the analyst by providing additional options for reasoning about attacks.

In a typical IDS, there are a number of sensors that produce alerts when certain activities are detected. These alerts are compared to a detection set to determine if a system-level alert should be issued. The detection set defines intrusions such that, if a set of alerts matches the detection set, the system-level alert may be triggered.

Traditional IDS have several limitations. First, most detectors are tuned to detect specific attacks. For example, a detector may be optimized to detect a buffer overflow attack against a web server. But it may not be able to detect other types of attacks as efficiently. Furthermore, most IDS do not attempt to automatically reason across multiple attacks. An intrusion may involve several different steps, possibly performed in such a way that responding to one attack makes the computer vulnerable to another attack.

An IDS tuned to a specific attack may not be able to detect or respond to such an attack in an efficient manner. Such emphasis on "single-step" attacks, as opposed to "multi-step" attacks puts the entire burden of reasoning across multiple steps of a potential attack on a human security analyst who must examine all intrusion attempts and determine if a multi-step attack is occurring. In such a situation, it is not merely the output of a single sensor that may concern an analyst, but an aggregation of sensor outputs that correspond to a set of sensors that are deployed in such a way as to capture an evolving attack. Moreover, traditional IDS do not explicitly consider uncertainty, which may limit an analyst's ability to model situations in which uncertainty might be a significant factor.

Such limitations may be addressed by a general attack modeling approach that incorporates uncertainty in the system along with environmental parameters and which can propagate uncertainty through to an inference result, a systematic approach to detection in the face of uncertainty incorporating a heuristic solution and guidance regarding expected results in various situations based on experimental findings.

Uncertainty may be seen from several sources. For example, as described above, a system level alert may be sounded when a particular set of alerts occurs from a group of sensors. However, a security analyst may realize, from past experience, that when one sensor generates an alert, there may be a 95% probability that an attack is occurring, but when another sensor generates an alert, there may be only a 60% probability that an attack is occurring.

A Bayesian model may be used to reason across the outputs of multiple sensors in the multi-step attack context. Such a model may scale better than a search-based solution. The following is an overview of a belief updating scheme (also known as a belief propagation scheme) for polytrees (also known as singly connected networks).

Consider FIG. 1, which represents an exemplary singly-connected network. Node X (102) is coupled to all other nodes in the network. Nodes 112, 114, 116, etc. are considered the "parents" of node X. Nodes 122, 124, 126, etc., are considered the "children" of node X.

Let $U=\{U_1, \ldots, U_n\}$ represent the set of X's parents and $Y=\{Y_1, \ldots, Y_m\}$ represent the set of X's children. Let e denote the set of available evidence with $e=e_X^- \cup e_X^+$ where $e_X^-$ represents the evidence in the network below X (i.e., connected to X through its children Y) and $e_X^+$ represents the evidence in the network above X (i.e. connected to X through its parents U). Let BEL(x) be the belief that node X has value x, i.e.

$$BEL(x) = P(X=x)$$

It has been shown that BEL(x) can be expressed as the following product (where $\alpha$ is a normalizing constant):

$$BEL(x) = \alpha P(e_X^- | x) P(x | e_X^+) \quad (1)$$

$$= \alpha \lambda(x) \pi(x)$$

Previous research has also shown that the two evidence subsets may be decomposed as follows:

$$e_X^- = \{e_{XY_1}^-, \ldots, e_{XY_m}^-\}$$

$$e_X^+ = \{e_{U_1X}^+, \ldots, e_{U_nX}^+\}$$

where $e_{XY_j}^-$ represents the evidence in the subnetwork below child node $Y_j$ and $e_{U_iX}^-$ represents the evidence in the subnetwork above parent node $U_i$.

Using the semantics of Bayesian networks, the quantities $\lambda$ and $\pi$ can be expressed as follows:

$$\lambda(x) \equiv P(e_X^- | x) = \prod_{j=1}^{m} \lambda_{Y_j}(x)$$

$$\pi(x) \equiv P(x | e_X^+) = \sum_{u} P(x | u) \prod_{i=1}^{n} \pi_X(u_i)$$

where $\lambda_{Y_j}(x)$ and $\pi_X(u_i)$ are given by $$\lambda_{Y_j}(x) = P(e_{XY_j}^- | x)$$

$$\pi_X(u_i) = P(u_i | e_{U_iX}^+)$$

Given the above quantities, node X can compute its belief as:

$$BEL(x) = \alpha \left[ \prod_{j=1}^{m} \lambda_{Y_j}(x) \right] \left[ \sum_{u} P(x | u) \prod_{i=1}^{n} \pi_X(u_i) \right]$$

The quantities $\lambda_{Y_j}(x)$ and $\pi_X(u_j)$ that are needed by node X to compute the above computation are provided by child and parent nodes, and are referred to as $\lambda$ and $\pi$ messages, respectively. Each node will send $\lambda$ messages to its parents and $\pi$ messages to its children, based upon a propagation scheme. These messages are defined as:

$$\lambda_X(u_i) = \beta \sum_{x} \lambda(x) \sum_{u_k : k \neq i} P(x | u_i, \ldots, u_n) \prod_{k \neq i} \pi_X(u_k) \quad (2)$$

$$\pi_{Y_j}(x) = \alpha \left[ \prod_{k \neq j} \lambda_{Y_k}(x) \right] \sum_{u_1, \ldots, u_n} P(x | u_1, \ldots, u_n) \prod_{i} \pi_X(u_i) \quad (3)$$

Having established the quantities above, the following procedure may be followed for inference in polytrees:

Step 1—Belief Updating: When node X receives a $\lambda$ message from its child or a $\pi$ message from its parent, it updates its belief according to the formula marked as (1).

Step 2—Bottom-Up Propagation: Node X computes new $\lambda$ messages to send to its parents according to (2).

Step 3—Top-Down Propagation: Node X computes new $\pi$ messages to send to its children according to (3).

Through the above procedure, messages may be passed through the network and the impact of new evidence becomes globally distributed. Equilibrium is reached when no new messages are generated. In this manner, the point probabilities of each of the sensors may be distributed.

While the above procedure represents a belief-updating scheme for polytrees, the above procedure is only defined for point probabilities. Thus, it cannot be used with uncertainty in network parameter values to compute uncertainty in belief. Thus, the following section will discuss reasoning across sensor outputs in a multi-step attack context, taking uncertainty into account.

At the level of an individual sensor, the TP and FP parameters refer to the probability of the sensor issuing an alert given that the attack for which the sensor is designed has occurred or not occurred, respectively. At the system level, where multiple sensors are used to determine whether to issue an alert, we define true positive and false positive rates in an analogous manner and denote these as system true positive (S_TP) and system false positive (S_FP), respectively. The observables at this level are not the host or network level observables processed by sensors but rather the sensor outputs themselves. In other words, the sensors represent a lower level of processing, the output of which comprise the input to the final level of processing at which system-level alerts are issued.

Let Q represent the binary query node that represents the analyst's event of concern. [INVENTOR: What is the difference between a query node, a detection node, and an exploit node?] Let A represent the binary detection node that represents whether or not a system-level alert is issued based on the observed set of sensor states. We can define S_TP and S_FP as follows:

$$S\_TP = P(A=TRUE | Q=TRUE) \quad (4a)$$

$$S\_FP = P(A=TRUE | Q=FALSE) \quad (4b)$$

The above equations mean that the system true positive rate (S_TP) is the probability that an alert is issued given that a node Q issues an alarm. The system false positive rate (S_FP) is the probability that an alert is issued given that a node Q does not issue an alarm.

Because we are concerned with the effects of model parameter uncertainty on the resulting system parameters, S_TP and S_FP, we may additionally define upper and lower posterior values as follows:

$$\underline{P}(A \mid Q) = \min_{model\ parameters} P(A \mid Q) \quad (5a)$$

$$\overline{P}(A \mid Q) = \max_{model\ parameters} P(A \mid Q) \quad (5b)$$

Using this notation we define the minimum and maximum system-level true positive and false positive rates as follows:

$$\underline{S\_TP} = \overline{P}(A=TRUE \mid Q=TRUE) \quad (6a)$$

$$\overline{S\_TP} = \underline{P}(A=TRUE \mid Q=TRUE) \quad (6b)$$

$$\underline{S\_FP} = \underline{P}(A=TRUE \mid Q=FALSE) \quad (6c)$$

$$\overline{S\_FP} = \overline{P}(A=TRUE \mid Q=FALSE) \quad (6d)$$

Let us now examine the problem of system-level detection in the absence of uncertainty. There are two values that may be of particular interest to a security analyst, S_FP and S_TP. A security analyst designing a system is interested in maximizing the S_TP value and minimizing the S_FP value. Thus the security analyst may choose an operating point of the system geared towards maximizing the S_TP value and minimizing the S_FP value.

An operating point is a distinct pair of S_FP and S_TP. The choice of an operating point is generally left to an analyst, because the choice of an operating point is generally one of preference—true positive rates and false positive rates have different costs for each organization. An operating point may be determined by calculate expected costs for each operating point and select the point with the minimum overall costs.

Operating points exist within a 2-dimensional space spanned by the parameters S_FP and S_TP. Each different configuration of the system potentially results in a different value of S_FP or S_TP. Because the number of possible operating points is equal to the cardinality of the power set of S, large networks can have many potential operating points. For a sensor network with N sensors, there are $2^{(2^N)}$ operating points. As an example of a set of operating points resulting from a simple 2-sensor network, consider FIG. 2A, which shows 12 operating points (it should be understood that four other operating points exist, but are not shown on this graph because they are not visible at this resolution). An analyst considering operating a detection system over these operating points has to consider the tradeoff between true positive and false positive rates. Obviously, the more operating points an analyst has to choose from, the greater the likelihood that the analyst will find a point deemed satisfactory from the perspective of the organizational priorities brought to bear on the selection process.

While a security analyst may choose to operate the above system at any of the 12 operating points, some do not make sense. With continued reference to FIG. 2A, note that S_FP is noted on X-axis 210 and S_TP is noted on Y-axis 220. Note that S_FP increases to the right of the X-axis while S_TP increases upward on the Y-axis. In other words, system performance is better in the upward and leftward direction. Better because both a lower false positive rate and a higher true positive rate are desirable characteristics. Thus, it would make no sense to choose point 232 over point 242 because point 242 is up and to the left of point 232 (in other words, point 242 has a lower S_FP and a higher S_TP). It should also be noted that a point does not have to be "dominated" to not make sense. For example, point 244 has a higher true positive rate than point 242 and is thus not dominated by point 242. But the S_FP rate of point 244 is so high that it does not make sense to choose point 244.

Using the above, one can define operating point dominance as follows: Point P1 dominates P2 if and only if exactly one of the following two conditions applies: Condition 1: P1 has a false positive rate equal to or less than that of P2 and P1 has a true positive rate greater than that of P2; and Condition 2: P1 has a false positive rate less than that of P2 and P1 has a true positive rate greater than or equal to that of P2. If either S_FP or S_TP are equal to each other for two operating points, neither point dominates the other.

Figure 2A:
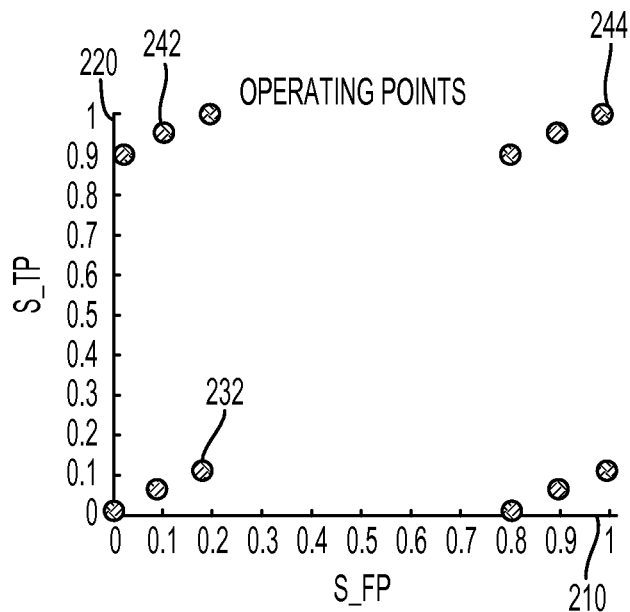
FIGS. 2A-2D are graphs illustrating exemplary operating points, comparing a true positive rate with a false positive rate.
Figure 2B:
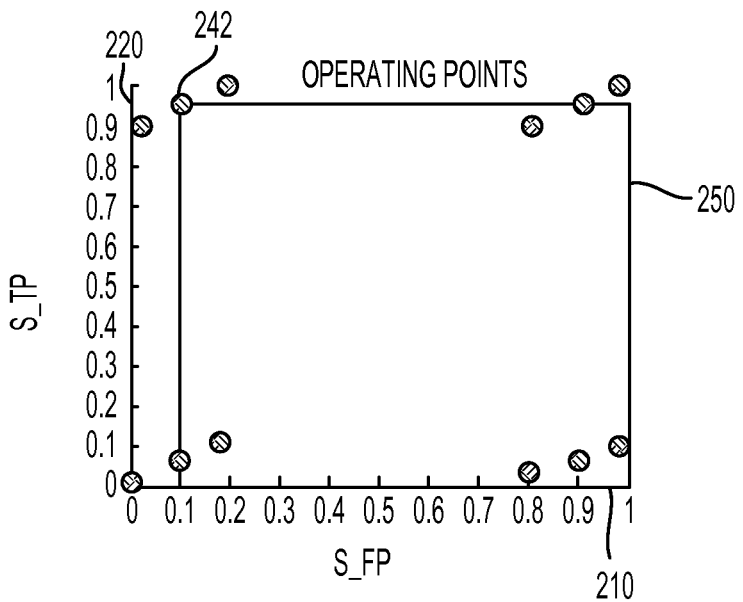

With reference to FIG. 2B, one can modify the graph of FIG. 2A by showing the set of operating points that are dominated by operating point 242. The points bounded by box 250 need not even be considered by a security analyst when designing the system. Thus, the remaining points (those not within the box) comprise the system level receiver operating characteristic (ROC) curve.

While a brute force approach such as shown above can be applied by enumerating all possible operating points, then eliminating all dominated operating points, it gets computationally expensive as the number of sensors becomes larger.

A more efficient approach is made possible by the observation that members of S (all the possible sensor value combinations) are disjoint events and that the probability of a union of disjoint events can be computed by summing the individual probabilities of each event.

Suppose the set of sensors outputs the observed pattern s. S_TP and S_FP values under the choice of detection set D are then given by the following expressions. Below, we use the shorthand $T_D$ and $F_D$ to refer to the S_TP and S_FP under detection set D, respectively.

$$T_D = P(s \in D \mid Q=TRUE)$$

$$F_D = P(s \in D \mid Q=FALSE)$$

The above expression is an adaptation of (1) based on the recognition that the event A=TRUE (a system-level alert is issued) corresponds to the event that the observed sensor output pattern s is a member of the detection set D.

Let the members of detection set D be indexed by j. Since these members are disjoint (exactly one sensor output combination can be observed at a time), the above expressions can be written:

$$T_D = \sum_j P(s = d_j \mid Q = TRUE) \quad (4a)$$

$$F_D = \sum_j P(s = d_j \mid Q = FALSE) \quad (4b)$$

Note that since D is a subset of S, any member of D is also a member of S. Thus, if we compute the posterior probability of each member of S, given Q is TRUE and the posterior probability of each member of S given that Q is FALSE, we exhaustively cover the needed inference computations. The required number of inference computations becomes $O(2^N)$ instead of $O(2^{2^N})$. Having computed and stored these posteriors, we can compute any result according to (4) through a lookup process. This efficiency, however, only reduces the number of inferences needed. The total number of S_TP and S_FP computations required is still $O(2^{2^N})$ which is exponential in the number of sensor output combinations. A further efficiency is desired.

Figure 2C:
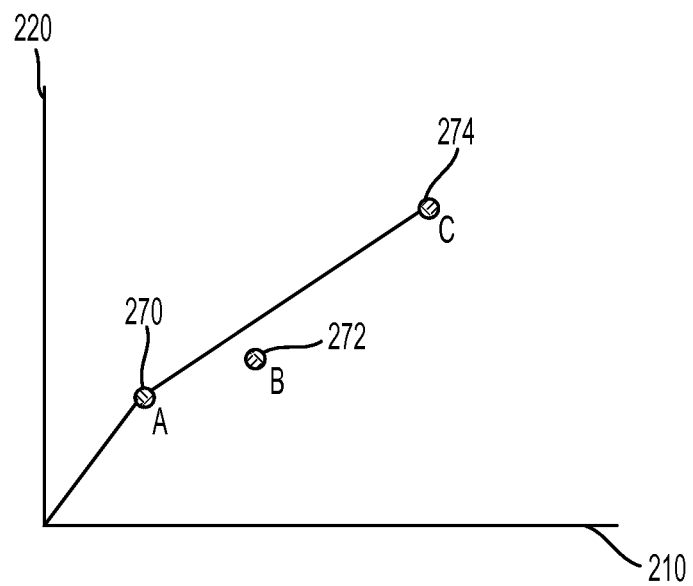

An efficiency that can be exploited is the fact that useful detection does not require enumeration of all dominant operating points. Instead, detection can be performed using a convex hull of the set of operating points. Note that the convex hull consists of a subset of the dominant operating points. To illustrate this point, consider FIG. 2C, which shows three hypothetical operating points in a Receiver Operating Characteristic (ROC) space, point 270, point 272, and point 274. As with FIGS. 2A and 2B, x-axis 210 is the false positive rate and y-axis 220 is the true positive rate.

While all of these points are valid operating points in the sense described above, we can eliminate point 272 without any loss of detection capability. This is because point 272 does not lie on the convex hull of this hypothetical set of operating points, as indicated by its position below a line that connects point 270 to point 274. A practitioner who desires to operate the detection system at an intermediate point between 270 and 274 can accomplish this by operating the system variably under operating point 270 or 274 in differing proportions and effectively achieve detection at any point along the line connecting point 270 and point 274. This approach may be considered a hybrid detection approach. Such a hybrid detection approach would provide the practitioner with a better option than operating at point 272, in a long-run statistical sense, because it gives the practitioner more operating point options, some of which actually dominate point 272. Note that while efficient algorithms exist for determining the convex hull of a set of points, a direct method is provided below.

The Operating Point Enumeration Theorem is as follows. Consider an N-sensor network with $n=2^N$ sensor output vectors. Let $S=\{s_i:1\leq i\leq n\}$ represent the set of detection sets with cardinality one indexed such that $$r_i \geq r_j, \forall_{j>i}$$

where $r_i = \dfrac{t_i}{f_i}$ is the ratio of true positive rate to false positive rate achieved under detection set $s_i$.

Then, the convex hull of operating points for this sensor network is given by the n operating points corresponding to the following n detection sets:

$$\{s_1\},\{s_1,s_2\},\ldots,\{s_1,s_2,\ldots,s_n\}$$

Figure 3:
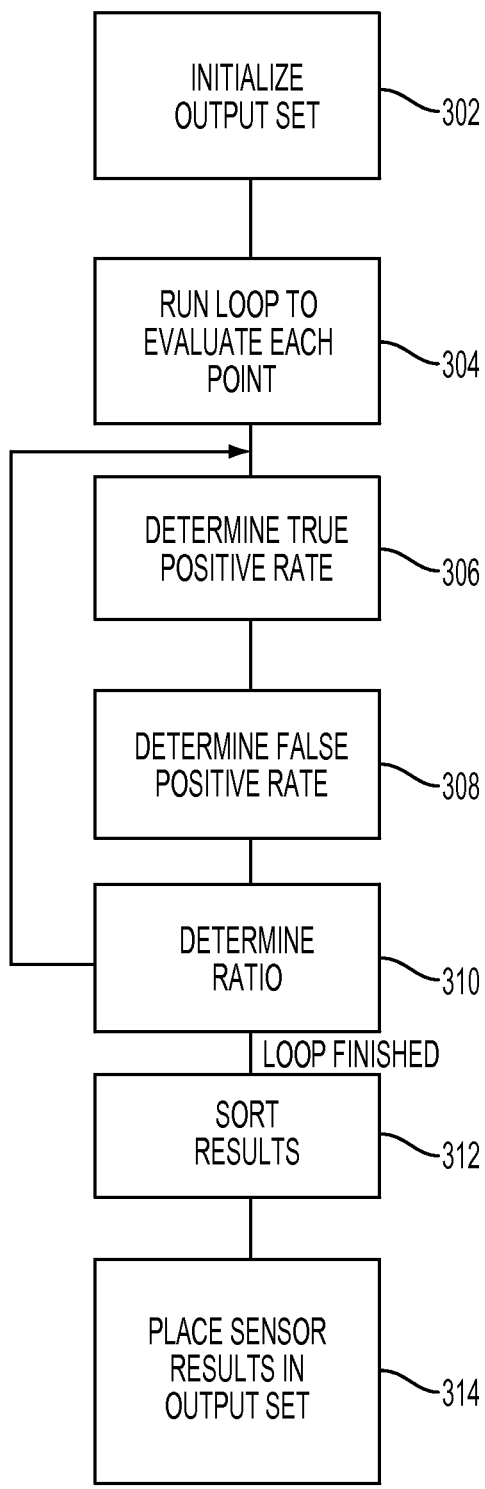
FIG. 3 is a flowchart illustrating the operation of one algorithm.

Using the above theorem, one can create an algorithm for finding the operating points as follows, set forth in the flowchart of FIG. 3:

The inputs of the algorithm are as follows:
S=$\{s_i:1\leq i\leq 2^N\}$, the set of sensor output combinations
Q, query node defining the intrusion under consideration
I, the intrusion definition under consideration The output of the algorithm is as follows: O=$\{o_i\}$, the set of useful system operating points (subsets of power set of S)

First, the output set is initialized with the null set O←∅ (302). Thereafter, a loop is run from i=1 to $2^N$ (304). For each value of i in the loop, the true positive rate of the point is calculated (306). The false positive rate is also calculated (308), along with the ratio of the true positive rate and the false positive rate (310). Each point being calculated represents the true positive rate and false positive rate for a particular node in the intrusion detection system. And for each node, each type of intrusion being detected by the node may have a true positive rate and a false positive rate. These values are then sorted by the ratio of the true positive rate and the false positive rate in descending order (312)

Thereafter, the value of $o_0$ is set to the null set. Thereafter, another loop is ran from i=1 to $2^N$. For each value of i, the union of $s_i$ and $o_{i-1}$ is determined and placed into $o_i$. (In formula format: $o_i \leftarrow s_i \cup o_{i-1}$) (316). At the end of this loop, the set O contains the set of useful system operating points. This is not merely the set of system operating points, because the dominated operating points are removed, the set O contains all the useful system operating points.

While the above algorithm works for point probability cases (i.e., cases with certainty), it must be modified to work in interval probability cases (i.e., cases with uncertainty). Instead of points representing each operating point, the uncertainty creates operating box regions, bound by the upper and lower limits of each S_FP and S_TP value. An operating box defines the locus of points at which a system might operate if detection were performed under the chosen detection set. Note that our inference methodology reveals no information regarding the distribution of operating points within the operating box. We can only say that the true operating point, whatever it may be, must lie within this box and that it can lie at any point within the box.

It is beyond the scope of this application, but it can be shown that while finding an algorithm for operating points can be done, it is not computationally feasible to find such an algorithm for operating boxes (i.e., an intrusion detection system that has uncertainty). Thus, one may wish to find heuristic solutions to this problem. Two heuristic solutions are presented below.

But first, a Point Detection Set Dominance Theorem is presented. The Point Detection Set Dominance Theorem is as follows:

Let X represent any detection set, including the null set. Then, the detection set $\{X,s_j\}$ cannot dominate the detection set $\{X,s_i\}$ if $$p_i=P(Q=\text{TRUE}|s=s_i)\geq p_j=P(Q=\text{TRUE}|s=s_j)$$

A proof of the above theorem is beyond the scope of this application. However, it may be stated that the proof of the theorem is performed by contradiction.

Figure 4:
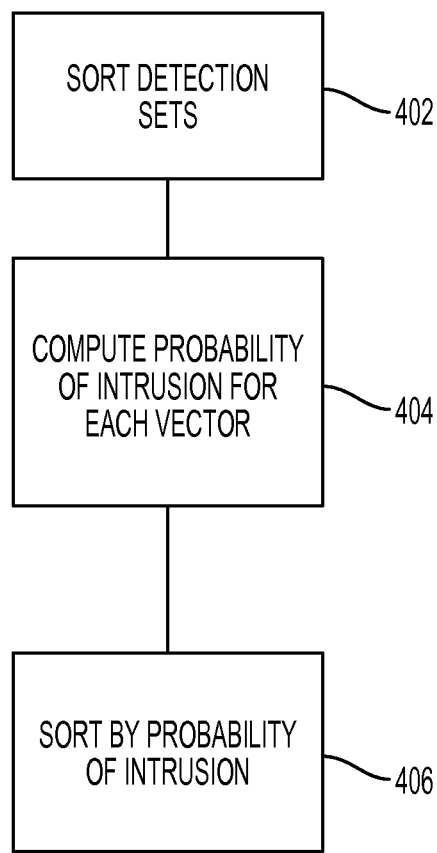
FIG. 4 is a flowchart illustrating the operation of another algorithm.

The result of the Point Detection Set Dominance Theorem establishes cases where one detection set cannot dominate another detection set for the point probability (certain) case. While this result does not establish that one detection set dominates another, it does allow one to rank certain sets of a given size by how many other sets cannot dominate them. Such a ranking may be an intuitively appealing metric of detection performance. Based on this intuitive notion, a set of promising detection sets can be constructed in the following manner, with reference to the flowchart of FIG. 4:

Initially, sort the singleton detection sets in descending order of lower posterior intrusion probability (402). Thereafter, consider a multi-step attack model with N sensors. This model has $n=2^N$ sensor output vectors. For each vector s, compute the posterior probability of intrusion, P(Q=TRUE|s) (404). Denote the n vectors $s_j, 1\leq j\leq n$ such that $$P(Q=\text{TRUE}|s_j)\geq P(Q=\text{TRUE}|s_i) \forall i>j$$

In other words, sort $s_j$ in decreasing order of posterior probability of intrusion (406).

The heuristic solution consists of exactly n detection sets, each having a different cardinality from 1 . . . n. Denote these sets as $H_j, 1\leq j\leq n$. Where $H_j$ is defined as follows:

$$H_j = H_{j-1} \cup s_j$$

where $$H_0 = \emptyset$$

Alternate Solution

The Operating Point Enumeration Theorem suggests a second potential heuristic based on the angle between an operating box and the horizontal. To compute this angle between an operating box and the horizontal, the operating box is resolved to a point that can be used to compute a ratio. A Best Point convention may be adopted for this solution (described more fully below). Based on this definition, we define our second heuristic as the output of a modified version of the Enumerate Operating Points algorithm set forth above, the only modification being that ratio $r_i$ is defined in the following alternate manner.

$$r_i \leftarrow \frac{\bar{t}_i}{\bar{f}_i}$$

In the following section, the above of heuristics are evaluated. The evaluation of a heuristic solution may not be straightforward because there is no clear metric to use when comparing a heuristic result to an optimal result. In the present case, an optimal result consists of the set of non-dominated operating boxes over all possible detection sets. Given such an optimal set, it must be determined how can such a set be compared with an alternative solution. To address this question, it should be noted that a practitioner's concern may be with determination of potential operating points based on the information provided by the solution set and the practitioner's specific organizational costs regarding true positives and false positives. Such a practitioner may, at some point, be forced to resolve the ambiguity inherent in an operating box by making a commitment to a particular point in the box and subsequently operating the IDS under the assumption of detection at that operating point. Consequently, in this section, we adopt a point perspective on evaluation: we resolve operating boxes to operating points and evaluate a heuristic solution as a set of operating points compared with an optimal set of points. Note that the process of resolving operating boxes to operating points could produce dominated points since there is no guarantee that a point resulting from a given box resolution will not be dominated. Therefore, a pruning process may be required following the conversion of a set of boxes to a set of points.

Figure 2D:
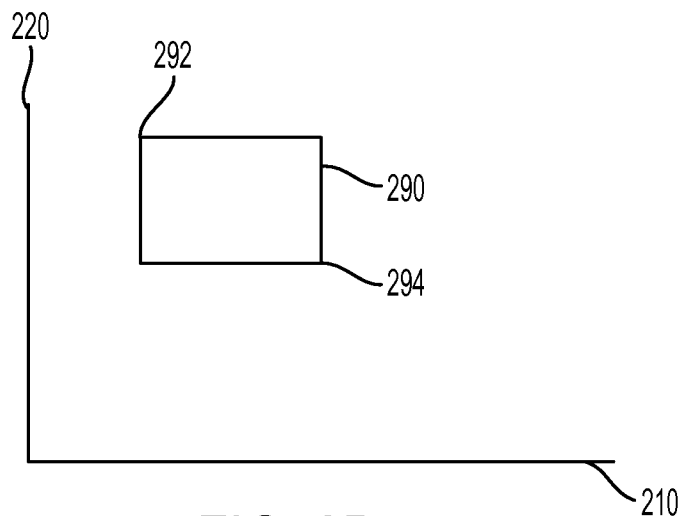

As discussed above, there are a variety of ways to resolve an operating box to a point can be defined, such as resolution to the Best Point, Worst Point, or some intermediate point which may vary depending on the operating box location. With reference to FIG. 2D, an exemplary operating box 290 is presented. As described above, because of uncertainty, an exact operating point may not be able to be determined. So instead of an operating point, one must work with an operating box 290, which contains a range of possible operating points. As with FIGS. 2A through 2C, x-axis 210 is the false positive rate and y-axis 220 is the true positive rate. The best point of an operating box is the point that dominates all other points in the operating box. In other words, it is the point in the upper-left most corner, point 292, which is the point with the highest true positive rate and lowest false positive rate. The worst point of an operating box is the point that is dominated by all other points in the box. In other words, the lower-right vertex of the operating box, (point 294) at the point of highest false positive rate and lowest true positive rate. For the purposes of this disclosure, operating boxes may be resolved to their Best Point and Worst Point and results can be presented for each case.

Having resolved our solution to a set of operating points from their constituent boxes, one may use a Receiver Operating Characteristic (ROC) perspective to conduct the evaluation. One way to conduct the evaluation is to determine the area-under-curve (AUC) for the ROC resulting from a given set of operating points. The ROC itself is a natural representation of our set of operating points that is useful in situations of unequal error costs as expected in real-world security situations. The ROC could be obtained simply by accepting all points in a given solution and eliminating any dominated points. However, another approach to ROC construction is to obtain the ROC by taking the convex hull of the set of operating points (described above). Note that several different algorithms may be available for computing convex hulls.

After deciding on using AUC as a measure of heuristic effectiveness, one must consider how to assess AUC quality. There are various approaches to assessing the quality of a heuristic solution. These include:

Exact solution of small instances: assess performance in small instances where optimal results can be obtained and assume the results will carry over into larger cases.

Bounds on optimal values: establish some provable upper bound on the deviation from optimality of a heuristic solution.

Built-in optimal solutions: construct test cases in such a manner that the optimal solution is known.

Statistical estimation: use a sample of solutions to predict where the true optimum may lie.

Best-known solution: compare performance to the best-known solution.

A best-known solution approach is not possible because there is no prior work attempting to enumerate operating boxes under uncertain Bayesian inference. A built-in optimal solution approach is also not possible for similar reasons. In addition, there is no sample of solutions available with which to employ an estimation approach. Consequently, bounds on optimal values and exact solution of small instances are the only viable approaches.

Regarding an exact solution of small instances, it should be noted that given a subset of optimal operating points, an upper bound on ROC AUC can be established by considering regions of TP-FP space where missing operating points cannot lie (otherwise they would dominate points that are known to be dominant). The remaining, permissible, regions of TP-FP space define the locus of possible remaining operating points. It may be possible to bound AUC by considering this locus of possible remaining operating points. Such bounding would require a provable method of enumerating a subset of operating points, a problem is too burdensome to adopt at this time. Thus, for the present application, an exact solution of small instances will be used. First, an AUC for the full enumeration is calculated, then compared with each heuristic result. It is expected that a given heuristic solution will have an AUC that is less than or equal to that of the full enumeration AUC. The closer the heuristic solution is to that of the full enumeration result, the less difference we expect to observe between the heuristic AUC and the full enumeration AUC. Thus, it is desirable to identify the heuristic solution with the smallest AUC delta from the full enumeration result.

While it is beyond the scope of this application, testing has shown that, while both heuristic approaches are very close to the full enumeration result, the results for the second heuristic approach are slightly better.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 5:
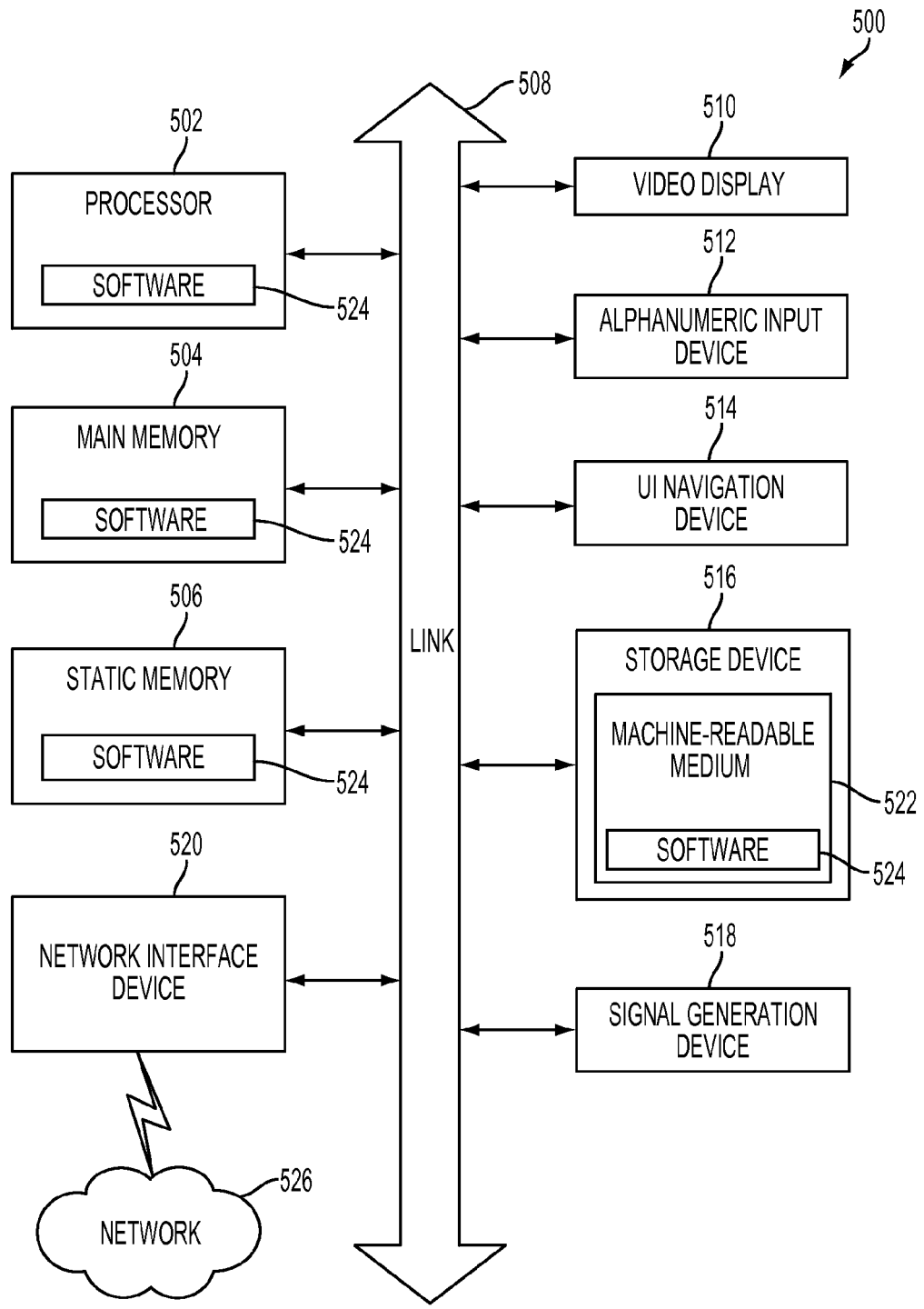
FIG. 5 is a block diagram of an exemplary machine capable of performing an embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse or track pad). In an example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The embodiments described above include:

Example 1 is a method for selecting an operating point of an intrusion detection system comprising: determining a true positive rate for the intrusion detection system at each of a plurality of possible vectors of sensor output values; determining a false positive rate for the intrusion detection system at each of a plurality of possible vectors of sensor output values; calculating a ratio of the true positive rate to the false positive rate of the intrusion detection system at each possible vector of sensor output values; sorting by the ratio of the true positive rate to the false positive rate; placing the sorted sensor combinations in an output set, wherein the output set represents a convex hull set of non-dominated operating points of the intrusion detection system; and selecting a first operating point from the output set for operating the intrusion detection system.

In example 2, the method of example 1 may optionally include wherein: determining the true positive rate for each detector comprises determining the true positive rate for each type of intrusion that each detector is capable of detecting; and determining the false positive rate for each detector comprises determining the false positive rate for each type of intrusion that each detector is capable of detecting.

In example 3, the method of example 1 may optionally include: selecting a second operating point from the output set; operating the intrusion detection system at the first operating point for a first predetermined amount of time; and operating the intrusion detection system at the second operating point for a second predetermined amount of time.

In example 4, the method of example 1 may optionally include wherein: the first predetermined amount of time and second predetermined amount of time are selected to produce an operating point that is intermediate between the first operating point and the second operating point.

In example 5, the method of example 1 may optionally include wherein placing the sorted sensor combinations in an output set comprises: determining a total number of members of the output set, wherein the total number of members is the number of possible combinations of sensor output values; numbering the sensor combinations from 1 to X, where X is the number of members of the output set; placing a first combination of sensor output values into the output set as a first member of the output set; setting the second member of the output set as the union of the first member of the output set and a second combination of sensor output values; setting the third member of the output set as the union of the second member of the output set and a third combination of sensor output values; and continuing setting members through the Xth member of the output set.

Example 6 is a method for selecting an operating point of an intrusion detection system comprising: determining a range of true positive rates for each sensor within the intrusion detection system; determining a range of false positive rates for each sensor within the intrusion detection system; creating an operating box wherein each operating box comprises the range of true positive rates and the range of false positive rates for the intrusion detection system; selecting a point within the operating box; calculating the ratio of the true positive rate to the false positive rate of each selected point; sorting by the ratio of the true positive rate to the false positive rate; placing the sorted sensor combinations in an output set, wherein the output set represents a convex hull set of non-dominated operating points of the intrusion detection system; and selecting a first operating point from the output set.

In example 7, the method of example 6 may optionally include wherein selecting a point within the operating box comprises: determining highest true positive rate within the operating box; determining the lowest false positive rate within the operating box; and selecting the point with the highest true positive rate and the lowest false positive rate.

In example 8, the method of example 6 may optionally include wherein: determining the range of true positive rates for each detector comprises determining the range of true positive rates for each type of intrusion that each detector is capable of detecting; and determining the range of false positive rates for each detector comprises determining the range of false positive rates for each type of intrusion that each detector is capable of detecting.

In example 9, the method of example 6 may optionally include: selecting a second operating point from the output set; operating the intrusion detection system at the first operating point for a first predetermined amount of time; and operating the intrusion detection system at the second operating point for a second predetermined amount of time.

In example 10, the method of example 7 may optionally include wherein: the first predetermined amount of time and second predetermined amount of time are selected to produce an operating point that is intermediate between the first operating point and the second operating point.

Example 11 is a machine-readable medium including instructions for selecting an operating point of an intrusion detection system, which when executed by a computing device, cause the computing device to: determine the true positive rate for the intrusion detection system at each possible vector of sensor output values; determine the false positive rate for the intrusion detection system at each possible vector of sensor output values; calculate the ratio of the true positive rate to the false positive rate of the overall intrusion detection system at each possible vector of sensor output values; sort by the ratio of the true positive rate to the false positive rate; place the sorted sensor combinations in an output set, wherein the output set represents a convex hull set of non-dominated operating points of the intrusion detection system; select a first operating point from the output set; and operate the intrusion detection system at the first operating point.

In example 12, the machine-readable medium of example 11 may optionally include wherein: determining the true positive rate for each detector comprises determining the true positive rate for each type of intrusion that each detector is capable of detecting; and determining the false positive rate for each detector comprises determining the false positive rate for each type of intrusion that each detector is capable of detecting.

In example 13, the machine-readable medium of example 11 may optionally include instructions which cause the machine to: select a second operating point from the output set; operate the intrusion detection system at the first operating point for a first predetermined amount of time; and operate the intrusion detection system at the second operating point for a second predetermined amount of time.

In example 14, the machine-readable medium of example 13 may optionally wherein: the first predetermined amount of time and second predetermined amount of time are selected to produce an operating point that is intermediate between the first operating point and the second operating point.

Example 15 is an intrusion detection system comprising: a plurality of sensors, each of the plurality of sensors arranged to produce one of a plurality of a sensor output values; processing circuitry arranged to: determine a true positive rate for the intrusion detection system at each of a plurality of possible vectors of sensor output values; determine a false positive rate for the intrusion detection system at each of a plurality of possible vectors of sensor output values; calculate a ratio of the true positive rate to the false positive rate of the intrusion detection system at each possible vector of sensor output values; sort by the ratio of the true positive rate to the false positive rate; place the sorted sensor combinations in an output set, wherein the output set represents a convex hull set of non-dominated operating points of the intrusion detection system; and select a first operating point from the output set for operating the intrusion detection system.

In example 16, the intrusion detection system of example 15 may optionally include wherein the processing circuitry is further arranged to: determine the true positive rate for each detector comprises determining the true positive rate for each type of intrusion that each detector is capable of detecting; and determine the false positive rate for each detector comprises determining the false positive rate for each type of intrusion that each detector is capable of detecting.

In example 17, the intrusion detection system of example 15 may optionally include wherein the processing circuitry is further arranged to: select a second operating point from the output set; operate the intrusion detection system at the first operating point for a first predetermined amount of time; and operate the intrusion detection system at the second operating point for a second predetermined amount of time.

In example 18, the intrusion detection system of example 15 may optionally include wherein: the first predetermined amount of time and second predetermined amount of time are selected to produce an operating point that is intermediate between the first operating point and the second operating point.

In example 19, the intrusion detection system of example 15 may optionally include wherein placing the sorted sensor combinations in an output set comprises: determining a total number of members of the output set, wherein the total number of members is the number of possible combinations of sensor output values; numbering the sensor combinations from 1 to X, where X is the number of members of the output set; placing a first combination of sensor output values into the output set as a first member of the output set; setting the second member of the output set as the union of the first member of the output set and a second combination of sensor output values; setting the third member of the output set as the union of the second member of the output set and a third combination of sensor output values; and continuing setting members through the Xth member of the output set.

Thus, the present invention has been described herein with reference to a particular embodiment for a particular application. Those having ordinary skill in the art and access to the present teachings will recognize additional modifications, applications, and embodiments within the scope thereof.

The particular implementations shown and described are illustrative of the invention and its best mode and are not intended to otherwise limit the scope of the present invention in any way. Indeed, for the sake of brevity, conventional data processing, data transmission, and other functional aspects of the system may not be described in detail. Furthermore, the connecting lines shown in the various figures are intended to represent functional relationships and/or physical couplings between the various elements. Many alternative or additional functional relationships or physical connections may be present in a practical system.

In the foregoing description, the invention has been described with reference to specific exemplary embodiments. However, it will be appreciated that various modifications and changes may be made without departing from the scope of the present invention as set forth herein. The description and figures are to be regarded in an illustrative manner, rather than a restrictive one, and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

It is therefore intended by the appended claims to cover any and all such applications, modifications and embodiments within the scope of the present invention.

What is claimed is:

1. A processor-implemented method for selecting an operating point of an intrusion detection system in a computer, the method comprising:
    determining a true positive rate for the intrusion detection system at each of a plurality of possible vectors of sensor output values;
    determining a false positive rate for the intrusion detection system at each of a plurality of possible vectors of sensor output values;
    calculating a ratio of the true positive rate to the false positive rate of the intrusion detection system at each possible vector of sensor output values;
    sorting by the ratio of the true positive rate to the false positive rate;
    placing sorted sensor combinations in an output set, wherein the output set represents a convex hull set of non-dominated operating points of the intrusion detection system;
    selecting a first operating point from the output set for operating the intrusion detection system;
    selecting a second operating point from the output set;
    operating the intrusion detection system at the first operating point for a first predetermined amount of time; and
    operating the intrusion detection system at the second operating point for a second predetermined amount of time.

2. The method of claim 1 wherein:
    determining the true positive rate for each detector comprises determining the true positive rate for each type of intrusion that each detector is capable of detecting; and
    determining the false positive rate for each detector comprises determining the false positive rate for each type of intrusion that each detector is capable of detecting.

3. The method of claim 1 wherein:
    the first predetermined amount of time and second predetermined amount of time are selected to produce an operating point that is intermediate between the first operating point and the second operating point.

4. The method of claim 1 wherein placing the sorted sensor combinations in an output set comprises:
    determining a total number of members of the output set, wherein the total number of members is a number of possible combinations of sensor output values;
    numbering the sensor combinations from 1 to X, where X is the number of members of the output set;
    placing a first combination of sensor output values into the output set as a first member of the output set;

setting the second member of the output set as the union of the first member of the output set and a second combination of sensor output values;

setting the third member of the output set as the union of the second member of the output set and a third combination of sensor output values; and continuing setting members through the Xth member of the output set.

5. A processor-implemented method for selecting an operating point of an intrusion detection system in a computer system, the method comprising:

determining a range of true positive rates for each sensor within the intrusion detection system;

determining a range of false positive rates for each sensor within the intrusion detection system;

creating an operating box wherein each operating box comprises the range of true positive rates and the range of false positive rates for the intrusion detection system;

selecting a point within the operating box;

calculating the ratio of the true positive rate to the false positive rate of each selected point;

sorting by the ratio of the true positive rate to the false positive rate;

placing the sorted sensor combinations in an output set, wherein the output set represents a convex hull set of non-dominated operating points of the intrusion detection system; and selecting a first operating point from the output set.

6. The method of claim 5 wherein selecting a point within the operating box comprises:

determining highest true positive rate within the operating box;

determining the lowest false positive rate within the operating box; and selecting the point with the highest true positive rate and the lowest false positive rate.

7. The method of claim 5 wherein:

determining the range of true positive rates for each detector comprises determining the range of true positive rates for each type of intrusion that each detector is capable of detecting; and determining the range of false positive rates for each detector comprises determining the range of false positive rates for each type of intrusion that each detector is capable of detecting.

8. The method of claim 5 further comprising:

selecting a second operating point from the output set;

operating the intrusion detection system at the first operating point for a first predetermined amount of time; and operating the intrusion detection system at the second operating point for a second predetermined amount of time.

9. The method of claim 6 wherein:

the first predetermined amount of time and second predetermined amount of time are selected to produce an operating point that is intermediate between the first operating point and the second operating point.

10. A machine-readable medium comprising a storage device to store instructions including instructions for selecting an operating point of an intrusion detection system, which when executed by a computing device, cause the computing device to:

determine the true positive rate for the intrusion detection system at each possible vector of sensor output values;

determine the false positive rate for the intrusion detection system at each possible vector of sensor output values;

calculate the ratio of the true positive rate to the false positive rate of the overall intrusion detection system at each possible vector of sensor output values;

sort by the ratio of the true positive rate to the false positive rate;

place the sorted sensor combinations in an output set, wherein the output set represents a convex hull set of non-dominated operating points of the intrusion detection system;

select a first operating point from the output set;

operate the intrusion detection system at the first operating point select a second operating point from the output set;

operate the intrusion detection system at the first operating point for a first predetermined amount of time; and operate the intrusion detection system at the second operating point for a second predetermined amount of time.

11. The machine-readable medium of claim 10 wherein:

determining the true positive rate for each detector comprises determining the true positive rate for each type of intrusion that each detector is capable of detecting; and determining the false positive rate for each detector comprises determining the false positive rate for each type of intrusion that each detector is capable of detecting.

12. The machine-readable medium of claim 10 wherein:

the first predetermined amount of time and second predetermined amount of time are selected to produce an operating point that is intermediate between the first operating point and the second operating point.

13. An intrusion detection system comprising:

a plurality of sensors, each of the plurality of sensors arranged to produce one of a plurality of a sensor output values;

processing circuitry arranged to:

determine a true positive rate for the intrusion detection system at each of a plurality of possible vectors of sensor output values;

determine a false positive rate for the intrusion detection system at each of a plurality of possible vectors of sensor output values;

calculate a ratio of the true positive rate to the false positive rate of the intrusion detection system at each possible vector of sensor output values;

sort by the ratio of the true positive rate to the false positive rate;

place the sorted sensor combinations in an output set, wherein the output set represents a convex hull set of non-dominated operating points of the intrusion detection system; and select a first operating point from the output set for operating the intrusion detection system;

select a second operating point from the output set;

operate the intrusion detection system at the first operating point for a first predetermined amount of time; and operate the intrusion detection system at the second operating point for a second predetermined amount of time.

14. The intrusion detection system of claim 13 wherein the processing circuitry is further arranged to:

determine the true positive rate for each detector comprises determining the true positive rate for each type of intrusion that each detector is capable of detecting; and determine the false positive rate for each detector comprises determining the false positive rate for each type of intrusion that each detector is capable of detecting.

15. The intrusion detection system of claim 13 wherein:

the first predetermined amount of time and second predetermined amount of time are selected to produce an operating point that is intermediate between the first operating point and the second operating point.

16. The intrusion detection system of claim 13 wherein placing the sorted sensor combinations in an output set comprises:
- determining a total number of members of the output set, wherein the total number of members is a number of possible combinations of sensor output values;
- numbering the sensor combinations from 1 to X, where X is the number of members of the output set;
- placing a first combination of sensor output values into the output set as a first member of the output set;
- setting the second member of the output set as the union of the first member of the output set and a second combination of sensor output values;
- setting the third member of the output set as the union of the second member of the output set and a third combination of sensor output values; and
- continuing setting members through the Xth member of the output set.

* * * * *

UNITED STATES PATENT AND TRADEMARK OFFICE
CERTIFICATE OF CORRECTION

PATENT NO.       : 9,218,486 B2
APPLICATION NO.  : 14/059832
DATED            : December 22, 2015
INVENTOR(S)      : Robert J. Cole It is certified that error appears in the above-identified patent and that said Letters Patent is hereby corrected as shown below:

Title Page, item (56)
On page 2, in column 1, under "Other Publications", line 1, delete "Emrirical" and insert --Empirical--, therefor In the Specification
In column 12, line 8, delete "526" and insert --516--, therefor In the Claims
In column 18, line 49, in Claim 13, after "system;", delete "and", therefor Signed and Sealed this
Twenty-eighth Day of June, 2016

Michelle K. Lee
*Director of the United States Patent and Trademark Office*